United States Patent [19]

Pearman et al.

[11] Patent Number: 5,237,657
[45] Date of Patent: Aug. 17, 1993

[54] APPARATUS FOR MANIPULATING A PICTURE REPRESENTED BY A VIDEO SIGNAL

[75] Inventors: James B. Pearman, Basingstoke; David J. Hedley, Winchester, both of England

[73] Assignee: Sony Corporation, Tokyo, Japan

[21] Appl. No.: 782,880

[22] Filed: Oct. 17, 1991

Related U.S. Application Data

[63] Continuation of Ser. No. 468,932, Jan. 23, 1990, abandoned.

[30] Foreign Application Priority Data

Mar. 17, 1989 [GB] United Kingdom ............... 8906177

[51] Int. Cl.$^5$ ............................................. G06F 15/40
[52] U.S. Cl. ................................. 395/164; 395/162; 340/798; 340/799
[58] Field of Search ............... 395/144, 155, 157, 164, 395/162; 340/747, 750, 798, 799

[56] References Cited

U.S. PATENT DOCUMENTS

| | | | |
|---|---|---|---|
| 3,943,493 | 3/1976 | Shelton | 340/172.5 |
| 4,148,070 | 4/1979 | Taylor | 358/160 |
| 4,571,684 | 2/1986 | Takanabe et al. | 364/449 |
| 4,680,622 | 7/1987 | Barnes et al. | 358/22 |
| 4,725,892 | 2/1988 | Suzuki et al. | 358/287 |
| 4,736,309 | 4/1988 | Johnson et al. | 364/521 |
| 4,757,470 | 7/1988 | Bruce et al. | 364/900 |
| 4,758,963 | 7/1988 | Gordon et al. | 364/481 |
| 4,768,156 | 8/1988 | Whitehouse et al. | 364/521 |
| 4,789,962 | 12/1988 | Berry et al. | 364/900 |
| 4,926,349 | 5/1990 | Thor | 364/523 |
| 4,999,790 | 3/1991 | Murayama et al. | 364/521 |
| 5,093,915 | 3/1992 | Platteter et al. | 395/700 |
| 5,113,491 | 5/1992 | Yamnazaki | 395/141 |
| 5,123,087 | 6/1992 | Newell et al. | 395/155 |

FOREIGN PATENT DOCUMENTS

| | | |
|---|---|---|
| 0249661 | 12/1987 | European Pat. Off. . |
| 2565447 | 12/1985 | France . |
| 1122048 | 7/1968 | United Kingdom . |
| 1535091 | 12/1978 | United Kingdom . |
| 1568378 | 5/1980 | United Kingdom . |
| 2047042 | 11/1980 | United Kingdom . |
| 2158322 | 11/1985 | United Kingdom . |
| 2183067 | 5/1987 | United Kingdom . |

OTHER PUBLICATIONS

Fohry, et al., "Digitale Bildverarbeitung mit Tischcomputer", *Elektronik*, No. 12, 1982, pp. 52-56.

*Primary Examiner*—Phu K. Nguyen
*Attorney, Agent, or Firm*—William S. Frommer; Alvin Sinderbrand

[57] ABSTRACT

Apparatus for manipulating a picture (P1) represented by a video signal (V1) includes a picture manipulator (16R, 16G, 16B, 18R, 18G, 18B) responsive to data representing a desired manipulation to manipulate the picture by changing at least one geometrical parameter thereof. The picture manipulator is controlled by a computer (40) that comprises a keyboard 48 and track ball assembly (50) for entering command information indicative of how the picture is to be manipulated. The computer (40) incorporates processing software that enables the computer to act as processor means responsive to the command information to generate the data representing a desired manipulation. The computer (40) has a VDU (42) and incorporates display software responsive to the command information to cause the VDU to display a frame which is subjected to the same manipulation as that desired for the picture. The computer (40) is selectively connectable to the picture manipulator such that the computer can be used on-line to generate the data and supply it to the manipulator, to control the manipulator, or can be used off-line to generate the data.

22 Claims, 5 Drawing Sheets

APPARATUS FOR MANIPULATING A PICTURE REPRESENTED BY A VIDEO SIGNAL

This application is a continuation, of application Ser. No. 07/468,932, filed Jan. 23, 1990, now abandoned.

BACKGROUND OF THE INVENTION

1. Field of the Invention

This invention relates to the manipulation of pictures represented by video signals.

2. Description of the Prior Art

The art of manipulating pictures represented by digital video signals is well established. In essence, the manipulation is accomplished by: digitizing an analog video signal by sampling it and converting each sample, by pulse code modulation, into a binary word or byte representing that sample; storing fields or frames of the digitized signal in memory; and controlling either the reading to or writing from the memory so as to produce from each field or frame a picture that differs from that represented by the input video signal in that at least one geometrical parameter thereof is changed. Such geometrical parameter may, for example, comprise the location of the picture along one or more of up to three axes and/or the angular position of the picture about one or more axes. Other such parameters may comprise the size of the picture (in the horizontal and/or vertical direction thereof), the extent of shearing of the picture, and the perspective of the picture.

Figure 1:
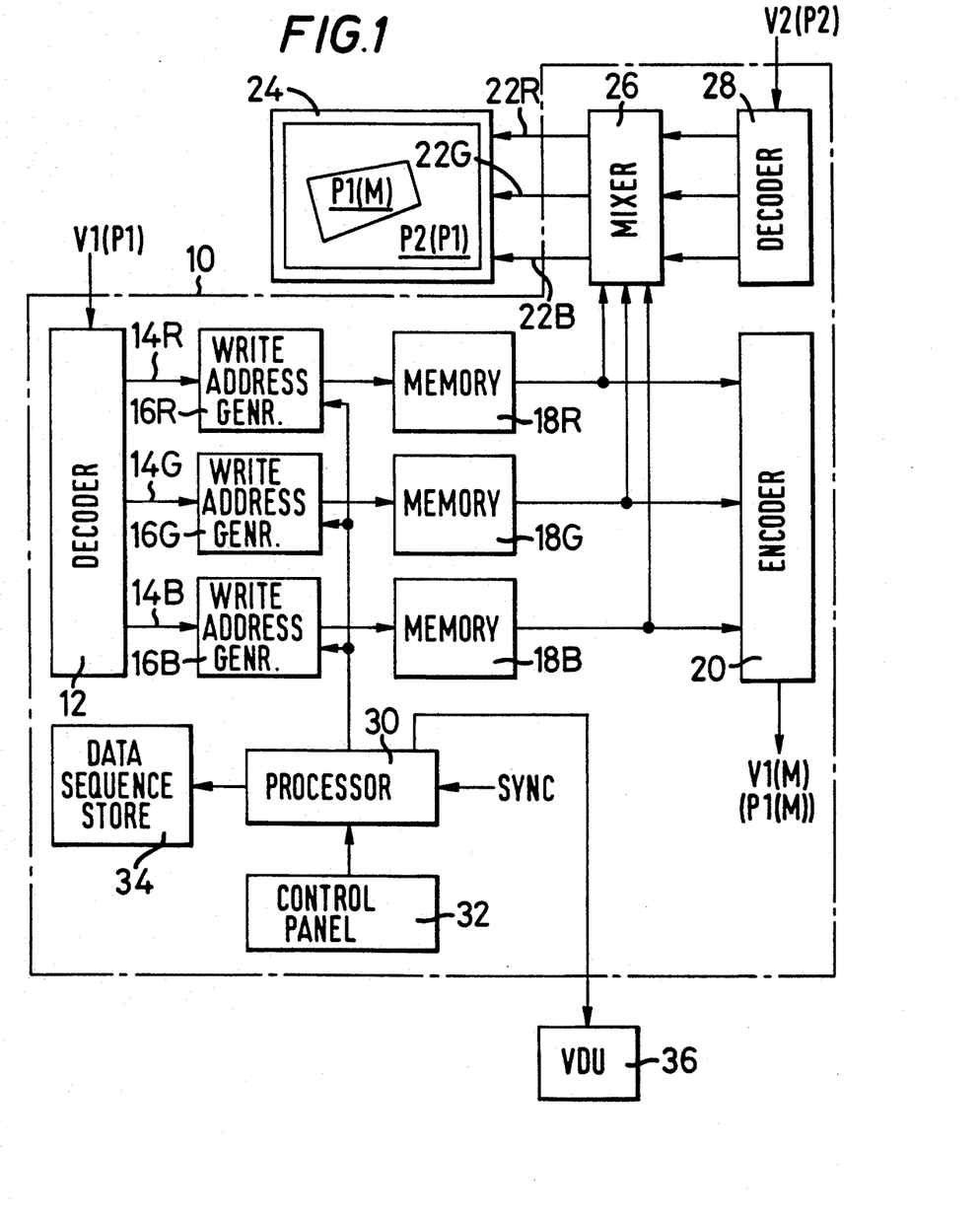
FIG. 1 is a block schematic diagram representing a generally known type of apparatus or equipment for manipulating a picture represented by a video signal.

FIG. 1 of the accompanying drawing shows in simplified block diagram form the general nature of present day digital video effects (DVE) equipment for effecting such manipulation of a picture. The general kind of apparatus now to be described with reference to FIG. 1 has been embodied in a variety of known proprietary items of DVE equipment, and the operation and construction thereof is well known to those skilled in the art.

The DVE equipment, which is designated 10 in FIG. 1, comprises a unitary piece of hardware containing the components shown in FIG. 1 and described below. A video signal V1 representing a picture P1 that is to be manipulated is inputted into the DVE equipment 10. If, for example, the signal V1 is a color composite signal, it may be supplied to a decoder 12 which produces R, G and B color component signals (for example) on busses 14R, 14G and 14B, respectively. (If the input signal V1 is in analog form, a digitizer (not shown)—for digitizing the signal as described above - may be positioned upstream of the decoder 12).

The R, G and B component signals on the busses 14R, 14G and 14B, respectively, are passed to a picture manipulator which comprises write address generators 16R, 16G and 16B and memories 18R, 18G and 18B for the respective component signals. Each memory 18R, 18G and 18B comprises one or more field or frame stores, and mapping between the locations of words in the fields or frames of the input signals on the busses 14R, 14G and 14B and words of corresponding output signal read from the memories is controlled (in a manner described more fully below) by the write address generators 16R, 16G and 16B in such a manner that the picture P1 is manipulated.

(Alternatively, the signals on the busses 14R, 14G and 14B can be read to the memories 18R, 18G and 18B, respectively, without manipulation, and the manipulation can be effected by read address generators (not shown) used in substitution for the write address generators 16R, 16G and 16B. In either case, the effect is the same.)

The manipulated component signals can then be treated in any one or more of a variety of ways. For example, as shown in FIG. 1, the manipulated signals read from the memories 18R, 18G and 18B can be fed into an encoder which encodesthem to form a color composite video output signal V1(M), representing a manipulated version P1(M) of the input picture P1, which can be broadcast directly or recorded on a video tape recorder. The manipulated color component signals read from the memories 18R, 18G and 18B can also be fed via busses 22R, 22G and 22B to R, G and B inputs of a monitor 24 whereby the manipulated picture P1(M) can be viewed on the screen of the monitor. The signals read from the memories 18R, 18G and 18B may, as shown, be supplied to the busses 22R, 22G and 22B via a mixer 26 which receives other R, G and B inputs from a decoder 28 that receives another color composite video signal V2, representing a picture P2 (which is not manipulated), whereby, as shown on the screen of the monitor 24 in FIG. 1, the manipulated picture P1(M) can be superimposed as a foreground picture on the picture P2 (which thus is a background picture).

The manipulation operation performed by the write address generators 16R, 16G and 16B is effected under the control of a processor 30 which receives command information (representing the picture manipulation desired) from a control panel 32. In a manner known per se, the processor 30 is responsive to the command information entered manually by an operator at the control panel 32 to generate data representing a desired manipulation, such data being applied to the write address generators 16R, 16G and 16B which are responsive thereto to effect the above-described mapping function that causes manipulation of the picture. In more detail, the input picture P1 (prior to manipulation) has a rectangular outline. In general, the manipulation involves moving the locations of at least some of the corners of the picture. The data produced by the processor 30 and applied to the write address generators 16R, 16G and 16B may therefore represent the locations of the corners (and may remain constant from field to field or frame to frame or may vary from field to field or frame to frame, depending upon whether the outline of the picture P1(M) is to remain constant or is to change). In more detail, the processor 30 may provide, for each field or frame, a matrix of data representing the locations of the corners of the manipulated picture P1(M) in the plane of the unmanipulated picture P1, and the write address generators 16R, 16G and 16B may, in a manner known per se, be responsive to such data to effect the above-described mapping operation to achieve the desired manipulation.

As represented by the legend "SYNC" in FIG. 1, vertical and horizontal synchronization information is supplied to the processor 30 to ensure that the data it produces is in synchronization with the video signal V1.

It is known, in the general type of DVE equipment shown at 10 in FIG. 1, for alphanumeric information indicating the current location of the manipulated picture P1(M), as dictated by commands entered via the control panel 32, to be displayed to the operator. Such information may, for example, be displayed on a visual display unit (VDU) 36 connected to the processor 30.

Figure 2:
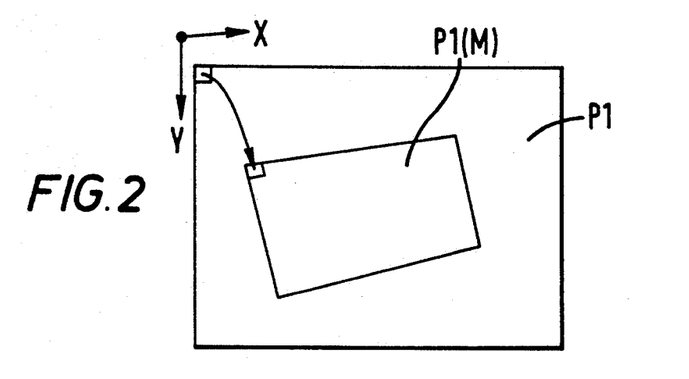
FIG. 2 shows the screen of a monitor connected to the apparatus of FIG. 1 and shows how a picture represented by a video signal may be manipulated.

As indicated above, the manipulation performed in the DVE equipment 10 may for example comprise translational and/or rotational movement of the picture P1 with respect to any one or more of three axes. With reference to FIG. 2 of the accompanying drawings, which shows the screen of the monitor 24, the X and Y axes can be those of the plane of the screen, as represented in FIG. 2, and the Z axis may be that passing through the origin of the X and Y axes perpendicular to the plane of FIG. 2. FIG. 2 shows, in similar manner to FIG. 1, a particular form that the manipulated picture P1(M) may adopt, either for an indefinite duration or for one particular field or frame. As will be appreciated, were the picture not manipulated, it would be displayed in a normal manner on the screen, occupying the full area thereof, as represented at P1 in FIG. 2. (That is to say, if no picture P2 were mixed in with the picture P1 and if the picture P1 were not manipulated, the picture P1 would occupy the full area of the screen of the monitor 24.) FIG. 2 indicates generally the mapping operation, as described above, which is performed to effect the manipulation. Thus, in writing to each memory 18R, 18G, 18B, the pixel corresponding to the word occupying the upper left-hand corner of the input picture P1 is so written to the corresponding memory that it occupies an address corresponding to that needed for the upper left-hand corner of the manipulated picture P1(M). A similar operation is performed for every other pixel. It should be noted that the mapping operation may involve very complex hardware. In this regard, the location of each pixel of the manipulated picture P1(M) will generally not correspond exactly to the location of a pixel in the input picture P1 whereby an interpolating filter will be needed to interpolate the positions of the pixels of the output pictures to sub-pixel accuracy. Moreover, the operation of the interpolating pixel may vary from field to field with the extent of manipulation required. Thus, as is known to those skilled in the art, the DVE equipment 10 is a very complex and expensive piece of hardware.

Moreover, although the processor 30 may be largely or wholly software-based, in systems as so far available the software is in substance deeply embedded within the hardware such that it cannot easily be altered.

The manipulations (effect creations) that can be performed using the DVE equipment 10 may be of a variety of forms. One simple form of manipulation or effect creation sequence will now be described, by way of example, with reference to FIG. 3 of the accompanying drawings. The operator first reduces the size of the picture P1 and changes its X and Y coordinates to form a first manipulated picture at a position P1(M1). He does this by entering appropriate commands on the control panel 32, observing the result on the monitor 24. He then enters further commands instructing that the manipulated picture be swept gradually towards the right, to a position P1(M2). He then enters similar commands instructing it to be swept gradually down to a position P1(M3), then to the left to a position P1(M4), and then up back to the position P1(M1), thereby completing a loop. Clearly, and as is well known, many other forms of manipulation involving translation and/or rotation and/or changes in size and/or shearing and/or perspective can be devised. The various commands involved in completing such a sequence may be stored in a data sequence store 34 and saved for future use.

Figure 3:
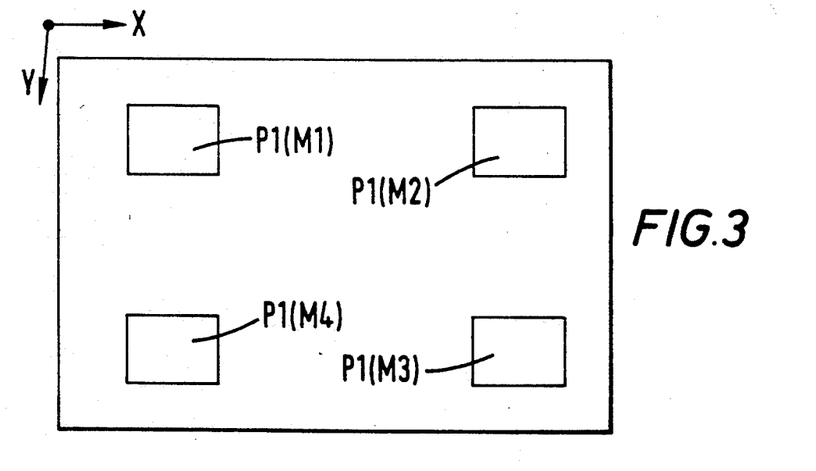
FIG. 3 again shows the screen of the monitor and illustrates, by way of example, a particular digital video effect that can be achieved by using the apparatus of FIG. 1.

The general form of known DVE equipment described with reference to FIGS. 1 to 3 is subject to several disadvantages. A first disadvantage is that the operator requires a great deal of training in order to use the equipment to devize even simple effects. Such training can be performed only on the actual equipment, which is uneconomical in that it involves taking up the time of a very expensive piece of equipment which could be employed to earn money. A second disadvantage is that even experienced operators may require a very long period of time to devize a particular effect, which again involves uneconomical use of the expensive equipment. These two factors may lead to the need to acquire several pieces of DVE equipment for training and/or devizing effects when only one would suffice for the actual carrying out of effects. A third disadvantage is that since, as explained above, the software that performs the processing carried out by the processor 30 is deeply embedded within the hardware, it is difficult or impossible to add on further desired features after manufacture of the equipment, i.e. either features not thought needed by the user when the system was designed or features devized after the design was effected.

An object of the invention is to reduce the time spent in training operators on expensive equipment that could otherwise be employed more usefully.

Another object of the invention is to reduce the time spent in devizing effects on expensive equipment that could otherwise be employed more usefully.

A further object of the invention is to make it relatively easy to change (e.g. enhance) the processing software.

Yet a further object of the invention is to facilitate the finding of a manipulated picture that has gone off-screen and/or to facilitate the devizing of an effect in which a picture moves between on-screen and off-screen positions.

SUMMARY OF THE INVENTION

According to one aspect of the present invention there is provided apparatus for manipulating a picture represented by a video signal. The apparatus comprises a picture manipulator responsive to data representing a desired manipulation to manipulate a picture represented by a video signal supplied thereto by changing at least one geometrical parameter thereof, manual input means for entering command information indicative of how it is desired that the picture be manipulated, and processor means responsive to the command information to generate the data representing a desired manipulation. The apparatus is characterized in that the manual input means comprises a manual input means to a computer, the computer incorporates processing software that enables the computer to act as the processor means, the computer has a visual display unit and incorporates display software that causes the visual display unit to display a frame which is subjected to the same manipulation as that desired for the picture, and the computer is selectively connectable to the picture manipulator such that the computer can be used on-line to generate said data and supply it to the manipulator to control the manipulator or can be used off-line to generate said data.

According to a second aspect of the invention there is provided a computer for use with a picture manipulator responsive to data representing a desired manipulation to manipulate a picture represented by a video signal supplied thereto by changing at least one geometrical parameter thereof. The computer comprises manual input means for entering command information indicative of how it is desired that the picture be manipulated, processing software that enables the computer to act as processor means responsive to the command information to generate the data representing a desired manipulation, a visual display unit, and display software responsive to the command information to cause the visual display unit to display a frame which is subjected to the same manipulation as that desired for the picture.

The invention enables the above-described disadvantages to be overcome or at least substantially alleviated. In this regard, the computer can be used wholly off-line both for training and for the devizing of effects. A new operator need not be given access to the expensive and complex hardware embodied in the picture manipulator until he has completed his training. Moreover, an experienced operator can devize an effect at his leisure on an off-line basis, for example on a desk-top computer in his office and/or at home, and needs access to the picture manipulator only when he has devized the effect. Thus, the economy of usage of the complex and expensive picture manipulator is optimised. It is, for example, possible for a particular organization to have, say, a single picture manipulator and several of the computers. Thus, for instance, various operators can devize effects on respective computers, save them to disk, and then load the disks into a particular computer normally associated with the particular picture manipulator for usage. Further, since the data representing a desired manipulation is generated by virtue of the computer being caused to act as the processor means due to the processing software incorporated in the computer, the processor means can readily be changed simply by loading modified processing software into the computer.

BRIEF DESCRIPTION OF THE DRAWINGS

The above and other objects, features and advantages of the invention will become apparent from the following detailed description of an illustrative and preferred embodiment, which is to be read in conjunction with the accompanying drawings, in which like references indicate like items throughout, and in which.

DESCRIPTION OF THE PREFERRED EMBODIMENT

Figure 4:
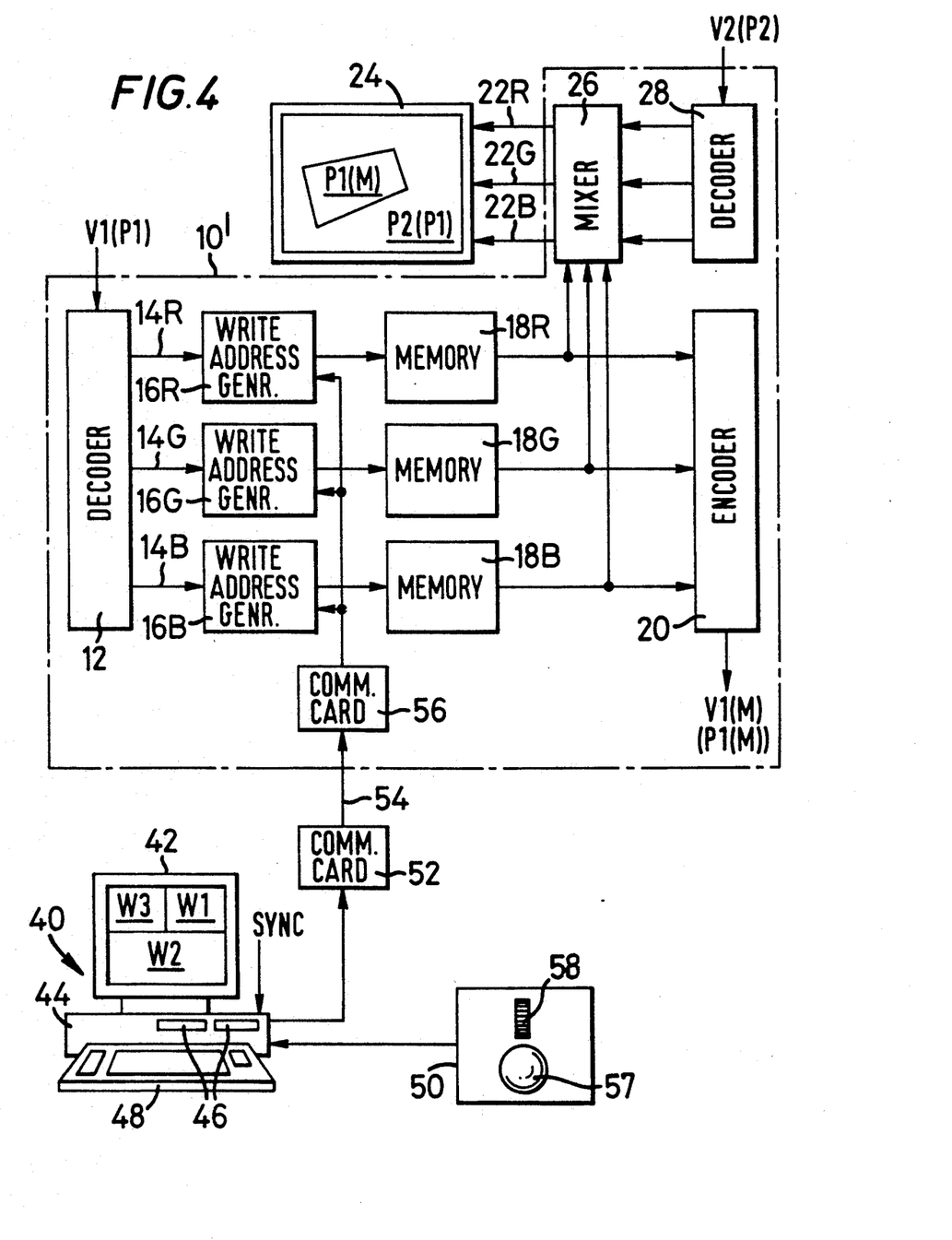
FIG. 4 shows apparatus embodying the invention for manipulating a picture represented by a video signal.

FIG. 4 shows apparatus embodying the invention for manipulating a picture represented by a video signal. The apparatus of FIG. 4 is in some respects generally the same as that described with reference to FIG. 1 and will therefore be described only in so far as it differs therefrom. References used in FIG. 4 that correspond to references used in FIG. 1 indicate like items. in essence the same as the DVE equipment 10 described with reference to FIG. 1 except that the processor 30, control panel 32, data sequence store 34 and VDU 36 are not used.

The apparatus of FIG. 4 includes a computer 40 connected to the DVE equipment 10'. The computer 40 comprises a VDU 42, a processor console 44 having one or more floppy disk drives 46 (and, if desired, containing a hard disk (not shown)), a manual input means constituted by a conventional keyboard 48 and a track ball assembly 50, and a communications card 52 (in fact installed within the console 44, though shown separately for convenience in FIG. 4) which is connected by a standard bus 54 to a corresponding communications card 56 within the DVE equipment 10'. The communications cards 52 and 56 can be high speed serial control cards using RS-422 balanced serial communications at 500 kilobauds. In the present arrangement, the computer 40 is a substantially standard IBM-compatible desk top computer, though other types of computer (e.g. so-called work stations) could instead by employed.

In the apparatus of FIG. 4, the keyboard 48 and tracker ball assembly 50 (which comprises a track ball 57 and a wheel 58) replaces the control panel 32 in the apparatus of FIG. 1. Also, processing software that enables the computer 40 to act as the processor 30 and data sequence store 34 of the apparatus of FIG. 1, and display software described below, is loaded in the computer 40.

The computer 40 includes operating software that, in a manner well known per se, enables windowing of the display provided by the VDU 42. That is to say, it enables respective different items of information generated by the display software in response to commands entered via the keyboard 48 and track ball assembly 50 to be displayed in respective windows W1, W2 and W3 of the screen of the VDU 42, as explained in more detail below.

Figure 5:
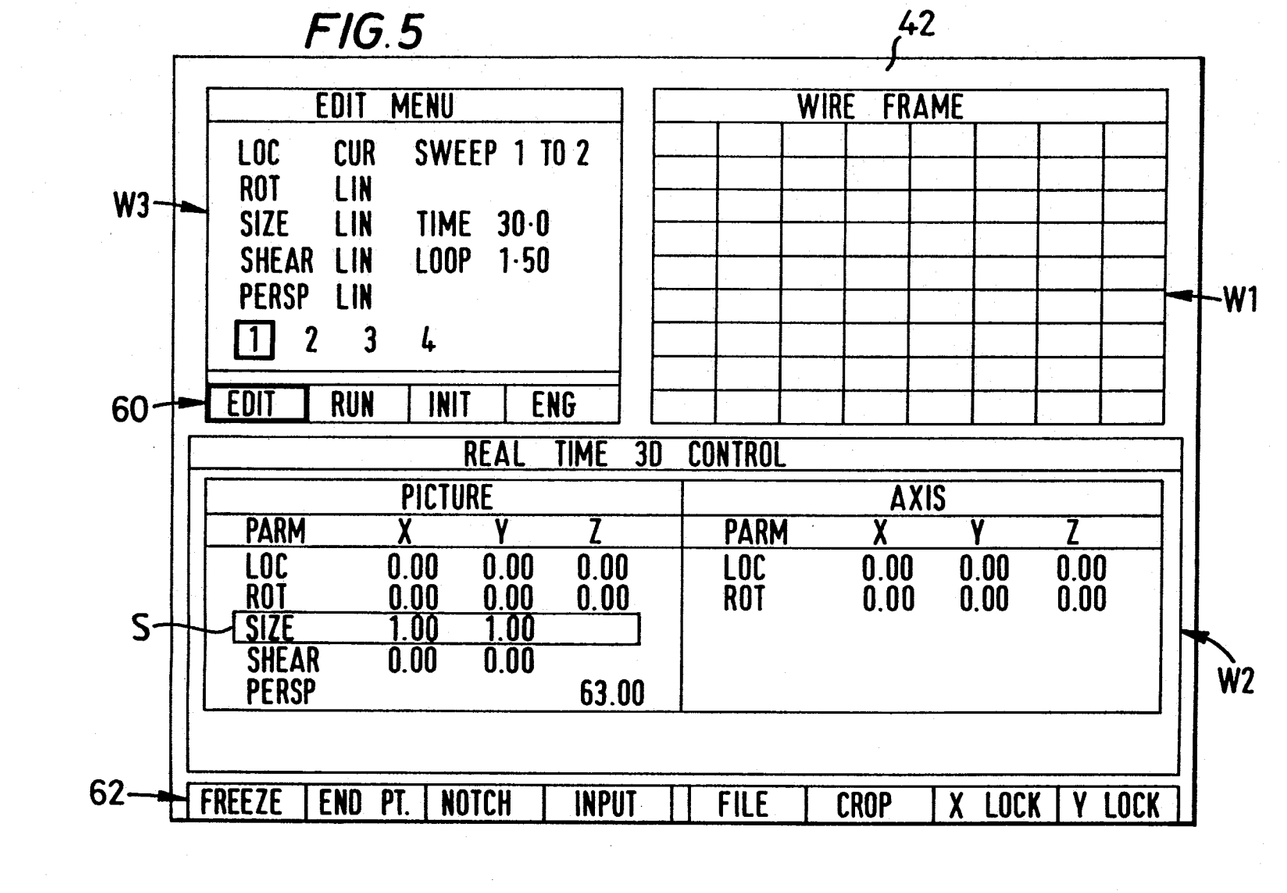
FIGS. 5 and 6 show examples of the display provided on a screen of a visual display unit (VDU) of a computer forming part of the apparatus of FIG. 4.

The three windows W1, W2 and W3 are shown in more detail in FIG. 5.

The window W1, as will be explained below, is particularly important in that it displays an analog of the visual effect being achieved by manipulations entered by means of the keyboard 48 and track ball assembly 50 whereby, even if the computer 40 is off-line, i.e. not connected to the DVE equipment 10', the operator (or trainee operator) can see what effect he is achieving. More specifically, the window W1 displays a frame which is subjected to the same manipulation as that (as indicated by the inputted commands) desired for the manipulated picture P1(M). In this regard, it was explained above that the processing software in the computer 40 performs the function of the processor 30 in FIG. 1, namely providing data in the form of a matrix identifying the locations of the corners of the manipulated picture P1(M). As will be clear to those with even an elementary knowledge of computer programming, it is readily possible, given such coordinates, to draw a frame linking the positions of those corners. Further, it is readily possible to draw a grid of lines which are contained within the outline defined by the frame and which, when the picture is unmanipulated, are parallel to the edges of said outline. The grid in fact comprises the well known so-called wire frame commonly used in, for example, computer aided design (CAD) equipment. The display software in the computer 40 is therefore responsive to the matrix of data provided by the processing software to generate substantially in real time, and display in the window W1, a wire frame which is subjected to the same manipulation as that to which the picture P1 is subjected, as viewed on the monitor 24 if the computer 40 is on-line, namely connected to the DVE equipment 10', or that to which the picture would be subjected if the computer were on-line. The operator or trainee operator can thereby readily see, by observing the window W1, the results of commands he has entered, in that the wire frame in the window W1 indicates visually the current location (translational and rotational) of the manipulated picture in the same way as the manipulated picture proper is displayed on the monitor 24.

The window W2 displays alphanumeric information corresponding to that displayed by the wire frame in the window W1. The information in the window W2 is thus generally similar to that provided in the apparatus of FIG. 1 on the VDU 36. This has the advantage of presenting information that is familiar to that provided in known equipment whereby an operator experienced in using the known equipment will feel comfortable with the apparatus of FIG. 4 in that the display it provides Will not be totally unfamiliar. Furthermore, the fact that the windows W1 and W2 are both in the field of view of the operator at the same time means that it is easy for the operator to observe and compare both the visual representation of the current picture location given by the wire frame and the alphanumeric information representing the current picture location.

In more detail, the window W2 provides two sets of information in two regions labelled "PICTURE" and "AXIS", respectively In each such region, the column heading "PARM" is an abbreviation for "parameter" and the columns headed X, Y and Z indicate values of X, Y and Z, as appropriate, for each parameter listed. In the region labelled "PICTURE", the parameters are: location ("LOC"), which indicates the translational position of the manipulated picture with respect to a reference position corresponding to non-manipulation; rotation ("ROT"), which indicates the extent of rotation; size, which indicates the size in both the X and Y directions with respect to a non-manipulated picture; shear, which indicates the extent to which the picture is sheared (subjected to manipulation such that opposite edges move with respect to one another but remain parallel whereby the rectangular non-manipulated picture adopts the form of a parallelogram); and perspective. It can be seen from the particular values of the parameters shown in FIG. 5 that, in this case, the current picture location as represented by the wire frame in the window W1 is not manipulated. That is to say, there is no translation or rotation, the size is unity in both the X and Y directions, there is no shearing and the perspective is at a value (63.00) corresponding to the picture not being manipulated to display any perspective.

The region of the window W2 labelled "AXIS" represents the location and extent of rotation of a user-defined axis about which the picture can be rotated. In this regard, in the apparatus of FIG. 4, rotation can be effected about the axis of the screen (i.e. the window W1), the axis of the picture, or the user-defined axis. The axis selected at any particular time is displayed on the window W2, though this information is not presented on FIG. 5 for the sake of clarity.

In FIG. 5, a box S is shown surrounding (outlining) the third row (SIZE) of the four columns in the region of the window W2 labelled "PICTURE". The box S preferably is displayed in a different color than the rest of the window W2 or in some other manner enabling it readily to be seen. By using cursor (arrow) keys of the keyboard 48, the box S can be moved so as to surround any one of the four rows of the four columns in the region of the window W2 labelled "PICTURE" or any one of the two rows of the four columns in the region of the window W2 labelled "AXIS". The display software is responsive to the actuation of the cursor keys that puts the box S into a desired position to accept command information received from the track ball assembly 50 as being information indicative of a change to be effected in the parameter associated with the current position of the box. For example, if the box S is moved two rows up from the position shown in FIG. 5, so as to surround the row relating to location of the picture, rotation of the track ball 57 in one sense causes translational movement of the picture in the X direction and rotation of the track ball 57 in the other sense causes translational movement of the picture in the Y direction. Rotation of the wheel 58 causes translational movement of the picture in the Z direction. Thus, the picture readily can be moved. Similarly, when rotation of the picture is selected by moving the box S down by one column, the picture can be rotated about the X, Y and Z axes using the track ball 50 and wheel 58. Likewise, when size or shear is selected, the size or extent of shear of the picture can be changed in the X and/or Y direction by moving the track ball 57, any input due to rotation of the wheel 58 in these cases being ignored. Further, the translational and rotational location of the user defined axis can be altered by positioning the box S to surround the appropriate row in the region of the window W2 labelled "AXIS". Similar effects could be achieved by using a joystick or mouse in substitution for the track ball, or even by using keys of the keyboard 48.

The window W3 presents an edit menu and has an edit bar 60 at the bottom indicating four data generation modes EDIT, RUN, INIT (initialization) and ENG (engineering) that can be selected by pressing the appropriate one of four menu keys forming part of the keyboard 48. The mode selected is highlighted on the menu 60, the EDIT mode having been selected in the particular case shown in Figure 5.

At the bottom of the screen 42, there is displayed a row of labels 62 that identify functional features currently available that can be selected by operating corresponding function keys of the keyboard 48.

The operation of the apparatus of FIG. 4 will now be described in more detail with reference to FIG. 5.

When the computer 40 is first used, the processing software has to be set up to conform with the hardware of the DVE equipment 10'. This is performed by selecting the initialization (INIT) and engineering (ENG) modes by using the menu keys and need not be described in detail.

Suppose then, for example, that the operator wishes to create the effect described above with reference to FIG. 3. Firstly, he selects the EDIT mode by pressing the associated menu key. He then uses the cursor keys of the keyboard 48 to position the box S around the row of entries in the region labelled "PICTURE" of the window W2 relating to size and, using the track ball assembly 50, reduces the manipulated picture to the size shown in FIG. 3. As a result, the wire frame displayed on the window W1 shrinks to a size which is the same as that of the manipulated picture as shown in FIG. 3, though it remains located centrally of the window W1.

(If the computer 40 were on line, the picture displayed on the monitor 24 would shrink in exactly the same manner.) He then selects "location", by moving the box S up two rows, and uses the track ball assembly 50 to move the shrunk picture to the location shown at P1(M1) in FIG. 3. The shrunk wire frame moves accordingly.

When the picture has thus been moved to the position P1(M1), the operator can press a particular one of a plurality of dedicated keys on the keyboard 48, which has the effect of storing that position or end point. In similar manner, the operator uses the track ball assembly 50 and the dedicated key on the keyboard 48 to define end points corresponding to the other three positions P1(M2), P1(M3) and P1(M4) shown in FIG. 3. To simplify his task, the operator can, during this process, depress an appropriate one of the function keys corresponding to the labels X-LOCK and Y-LOCK in the row 62, which respectively disable the track ball assembly 50 from moving the picture in the X and Y directions to insure that, when these features are selected, movement only in the Y and X directions, respectively, is possible.

Having selected the end points, the operator then selects the RUN mode by pressing the menu key corresponding thereto. In the RUN mode, the operator can select how movement between the selected end points is achieved. The operator can thus, for example, choose the time taken to move between the end points and whether or not the picture is to continually loop around between the end points. Information corresponding to the effect created is displayed, in coded alphanumeric form, in the window W3. The operator can observe the effect by watching the wire frame in the window W1 and the information displayed in the window W2 and can continually refine and adapt it until he is satisfied with it. When he is satisfied with it, he can press the function key corresponding to the FILE label in the row 62 whereby the created effect sequence or series of manipulations can be saved. The created effect may then, for example, be written to a floppy disk in one of the drives 46, when the computer 40 is being used off-line, and taken to another like computer 40 connected to the DVE equipment 10' for actual use.

In the EDIT mode, the information displayed in the window W3 contains, at the bottom, four numbers 1 to 4 corresponding to the selected end points. The highlighting of a number (the number 1 being highlighted in FIG. 5) indicates the current end point selected. In the RUN mode, a bar graph (not shown) indicates the current position within the effect.

As regards the remaining labels shown in the row 62 in FIG. 5, depressing the function key labelled FREEZE enables the operator to select whether the manipulated picture is frozen or whether it is allowed to continue moving in accordance with the input picture. The function key corresponding to the NOTCH label enables stepwise movement or rotation for evaluation. The function corresponding to the CROP label is explained below.

Figure 6:
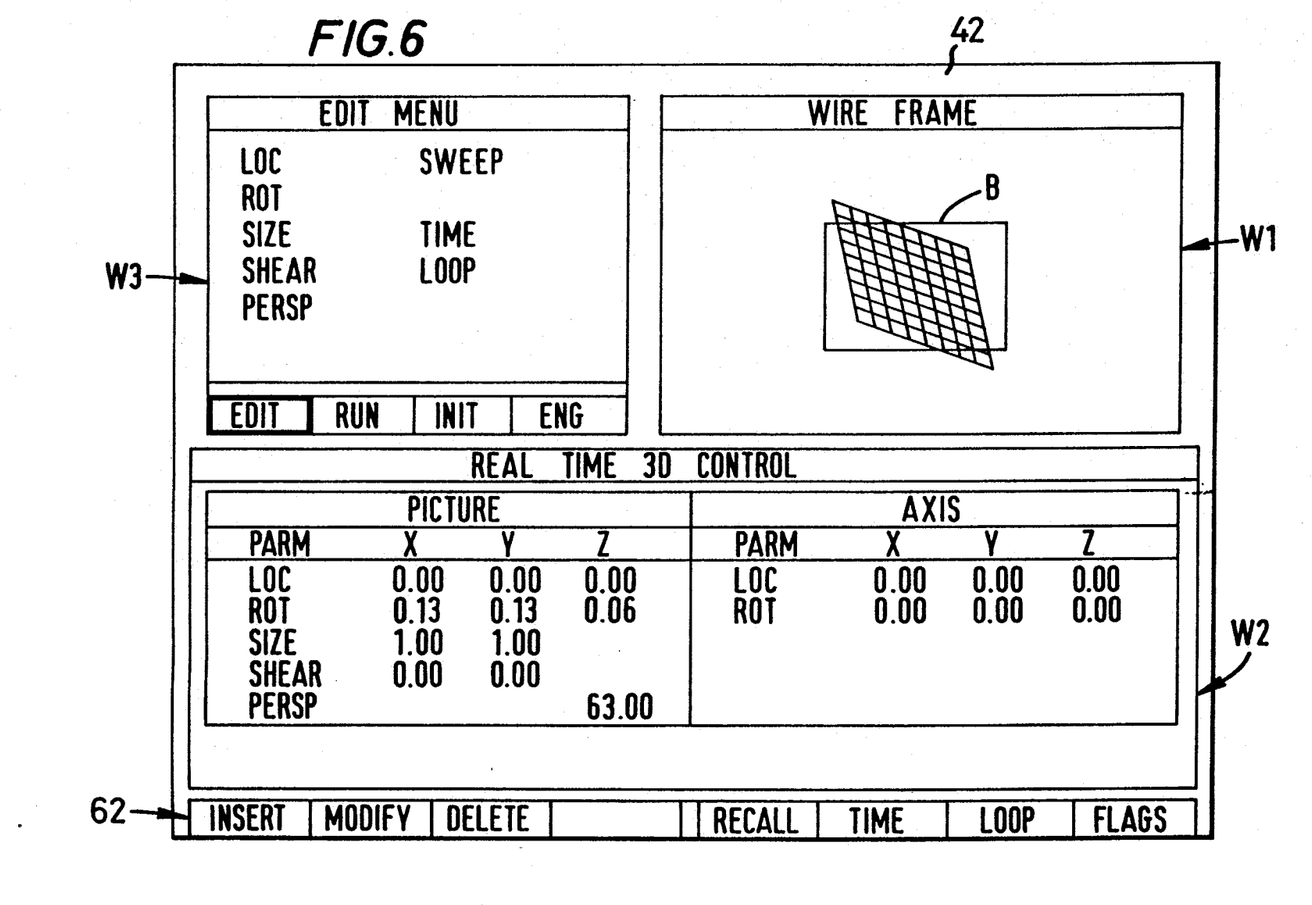

FIG. 6 shows the screen of the VDU 42 at a stage during the creation of another effect.

One thing that can be observed from FIG. 6 is that the labels in the row 62 are different. This is because the software is operative to change the labels at particular points within various routines in accordance with the features then desired.

It will also be seen from the PICTURE region of the window W2 that, in FIG. 6, the values for the rotation of the picture have values other than zero. Specifically, the picture has been rotated by 0.13 of a revolution about the X axis, 0.13 of a revolution about the Y axis and 0.06 of a revolution about the Z axis, which rotation is represented in the window W1 by a corresponding rotation, in the three directions, of the wire frame.

Figure 7:
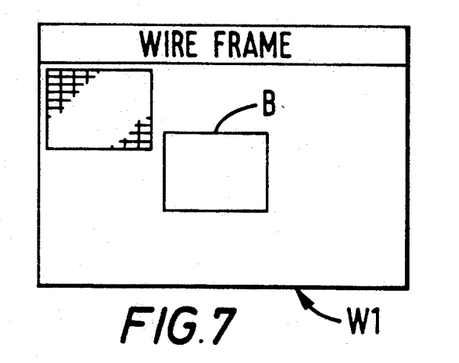
FIGS. 7 and 8 show examples of different information provided on one particular window of the VDU screen.

It will also be observed from FIG. 6 that, although the picture has not been reduced in size, i.e. the values for size in both the X and Y directions (as shown in the PICTURE region of the window W2) are still unity, the wire frame occupies only a small area of the window W1. This is because, in the case of FIG. 6, command information has been entered via the keyboard 48 to cause the window W1 to display an area which lies in the plane of the unmanipulated picture and is larger than the unmanipulated picture (whose area corresponds to that represented on the monitor 24). The boundary B of the unmanipulated picture is displayed in the window W1, whereby the relationship of the wire frame with the boundary can be observed even though the manipulated picture (as represented by the wire frame) is located partly outside of the wire frame. This feature, namely that of displaying an area larger than the picture boundary, is very helpful to operators. In this regard, with the conventional apparatus of FIG. 1 it is very easy, by accident, to input information which will cause the manipulated picture to go entirely off the screen of the monitor 24. It can then be very difficult to find it. However, as is shown in FIG. 7, if the above-described feature is selected in the apparatus of FIG. 4 it is possible to observe the wire frame even if (within certain limits) it disappears entirely outside of the boundary B (corresponding to the edges of the screen of the monitor 24). It is therefore easy to find the picture. Moreover, this feature can be useful when it is desired to devize an effect sequence in which the manipulated picture is to move from a position entirely off the screen to an on screen position or to move from an on screen position to a position entirely off the screen, since the entire sequence can be viewed.

There are some cases in which it is desired that the manipulation of the picture should involve the cropping of a part thereof, for example a part at the top in which a boom microphone has inadvertently been allowed to move into picture. The function key associated with the above-mentioned CROP label in the row 62 of FIG. 5 can be used in this connection. When this feature is selected, a colored frame readily distinguishable from the wire frame (and the boundary B, if displayed) can be displayed on the window W1 and moved to define the area to be retained. Suppose, for example, referring to FIG. 8, the part of the picture corresponding to the part of the wire frame above a line L is to be cropped. The frame is positioned so as to enclose the part of the wire frame below the line L. Then, when CROP is selected, the part above the line L is removed. When this has been done, it is of course desired to fill in the part of the picture above the line L in some way in order to ensure that the manipulated picture covers all the area of the unmanipulated picture, as represented by the boundary B. This can be done by depressing an "autosize" key, in which event the processing software is responsive thereto to expand the manipulated picture to such an extent that it covers all the area of the unmanipulated picture as represented by the boundary B. In the case of the particular example of FIG. 8, this would involve only a slight increase in size in the Y direction.

Figure 8:
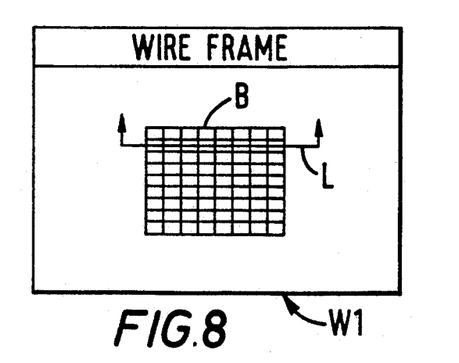

Similarly, it may be necessary to rotate a picture slightly to compensate for a slightly incorrect camera set up. In this event, the manipulated picture would again not cover all of the area of the unmanipulated picture. In this case, pressing the autosize key would result in slight expansion in both the X and Y directions, to the extent that the area within the boundary B is completely filled.

As will be appreciated from the foregoing, the computer 40 (which will cost very much less than the expensive DVE equipment) can be used off-line both for operator training and for the devizing of time-consuming effects. Therefore, a typical organization might have a single computer 40 associated with a single item of DVE equipment 10' for operating it on an on-line basis, and several off-line effects which can be saved to disk and loaded into the computer 40 associated with the DVE equipment 10' when needed. Since the organization may already possess some computers suitable for use as the computer 40, if fitted with the track ball assembly 50 and communications card 52 and loaded with the processing software and display software, the organization may be able to use these on an off-line basis, as and when required, thereby minimizing the capital cost of installing the equipment. It should also be appreciated that, in the apparatus of FIG. 4, since the processing function is achieved by virtue of the processing software in the computer 40, it is readily possible to enhance the processing features merely by replacing the software in the computer 40 with enhanced software.

Although not described above with reference to FIG. 1, DVE equipment of the present type may include a facility for manipulating either one of two pictures (picture A and picture B) represented by respective video signals, rather than (as described above) only a single picture P1. Thus, for example, an effect can be created in which picture A is first displayed, the picture is then rotated about a vertical axis and, as the picture becomes edge-on to the screen, i.e. as it is rotated past 90° about the vertical axis, either picture B or picture A is then displayed "on the back", as it were, of the picture. If this facility is provided in the DVE equipment 10', the processing software in the computer 40 can be operative to display either "A" or "B" in the window W1.

In the arrangement described above, all of the manipulations of the rectangular unmanipulated picture are such as to result in a picture which, while in three-dimensions, can be considered to be a distorted rectangle and/or a rectangle viewed otherwise than straight on. However, the invention is more generally applicable to more complex video effects in which the rectangular unmanipulated picture is manipulated into a more complex form, for example "wrapped" in three-dimensions to form a sphere or cylinder or part thereof. In this event, of course, the processing software may need to be more powerful in that the data it creates will need to be more than a matrix of data identifying the positions of the four corners of the picture.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus for manipulating a picture represented by a video signal comprised of a sequence of video signal frames each representing a respective frame of said picture having a predetermined geometrical parameters, comprising:

picture manipulating means responsive to command data supplied thereto representing a desired manipulation of a respective frame of said picture represented by a corresponding video signal frame for rearranging said corresponding video signal frame such that at least one geometrical parameter of said respective frame of said picture is thereby changed; and a plurality of computers each responsive to command information manually input to said computer by a user for generating said command data under the control of processing software stored in the respective computer; each said computer including:

manual input means for manually entering said command information in said respective computer;

a visual display unit operative to provide a display;

means for supplying data signals to said visual display unit under display software control such that said visual display unit is operative to display an image representing said respective frame of said picture which is subjected to the same manipulation as that desired for said respective frame of said picture; and interconnecting means for selectively connecting and disconnecting said each computer to said picture manipulating means such that said each computer is usable when connected to said picture manipulating means to communicate said command data thereto through said interconnecting means and usable when disconnected therefrom to generate said command data.

2. Apparatus according to claim 1, wherein each computer includes operating software that enables windowing of the display provided by said visual display unit, and wherein said means or supplying data signals to said visual display unit is operative under the control of said display software to supply said data signals such that said visual display unit is operative to display said image representing said respective frame in a first window and to display, in a second window, in alphanumeric form, information corresponding to the desired manipulation of said respective frame of said picture as represented by said image in said first window.

3. Apparatus according to claim 1, wherein said manual input means includes menu control keys and said means for supplying data signals to said visual display unit is operative under the control of said display software to supply said data signals such that said visual display unit is operative to display, in a third window, alphanumeric information, which, in conjunction with the operation of said menu control keys, enables different modes for generating said command data to be selected.

4. Apparatus according to claim 1, wherein said means for supplying data signals to said visual display unit is operative under the control of said display software to supply said data signals such that said visual display unit is operative to display an image representing said respective frame of said picture prior to manipulation thereof and lying in a plane of said display such that the area of said display is larger than an area of the image representing the unmanipulated respective frame of said picture, said image representing said unmanipulated respective frame of said picture at least including a boundary of said unmanipulated respective frame of said picture, and such that said visual display unit is operative to simultaneously display said image representing the manipulated respective frame of said picture together with said boundary such that the relationship of said image representing the manipulated respective frame with said boundary can be observed even when said image representing the manipulated respective frame is displayed at least partly outside of said boundary.

5. Apparatus according to claim 1, wherein said visual display unit is operative to display said image in the form of an outline which, when said respective frame of said picture is unmanipulated, is rectangular and corresponds to the edges of the respective frame of said picture.

6. Apparatus according to claim 5, wherein said visual display unit is operative to display said image in the form of a grid of lines within said outline which, when said respective frame of said picture is unmanipulated, are parallel to respective edges of said outline.

7. Apparatus according to claim 1, wherein said manual input means includes autosize control means for entering autosize command information to its respective computer and said computer is operative in response to said autosize command information entered by said autosize control means to generate said command data representing an expansion of a manipulated frame of said picture including an area smaller than that of the unmanipulated frame of said picture to an extent that it covers all of the area of the unmanipulated frame of said picture.

8. Apparatus according to claim 1, wherein said manual input means includes a plurality of function keys operative to enter functional feature commands to said computer, and said means for supplying data signals to said visual display unit is operative under the control of said display software to supply said data signals such that said visual display unit is operative to display, along a bottom of a display provided thereby, a row of labels identifying functional features currently available by operating corresponding function keys of said manual input means.

9. A computer for generating data representing a desired manipulation of a frame of a picture represented by a corresponding video signal frame to be effected by a picture manipulator which receives said corresponding video signal frame and rearranges the latter such that at least one geometrical parameter of said frame of said picture is thereby changed, the computer comprising:
  manual input means for entering commands identifying said desired manipulation of said frame of said picture;
  means operative under the control of processing software stored in said computer and responsive to said commands manually entered with the use of said manual input means for generating said data representing said desired manipulation;
  visual display means for controllably providing a display;
  means operative under the control of display software stored in said computer for controlling said visual display means in response to said commands to cause said visual display means to display an image representing said frame of said picture which image is subjected to the manipulation that is desired for said frame of said picture; and
  interconnecting means for selectively connecting and disconnecting said computer to and from said picture manipulator and for communicating said data representing said desired manipulation from said computer to said picture manipulator when said computer is connected thereto.

10. A computer according to claim 9, which includes operating software that enables said computer to control said visual display means to window the display provided thereby, said computer being operative with the use of said display software for controlling said visual display means to display said image representing the manipulated frame in a first window and to display, in a second window, in alphanumeric form, information corresponding to the desired manipulation of said frame of said picture as represented by said image in said first window.

11. A computer according to claim 10, wherein said manual input means includes menu control keys, and wherein said computer is operative with the use of said display software for controlling said visual display means to display, in a third window, alphanumeric information, which, in conjunction with said menu control keys, enables different modes for generating said data representing a desired manipulation to be selected.

12. A computer according to claim 9, wherein said visual display means is operative under the control of said computer with the use of said display software to display an image representing said frame of said picture prior to manipulation thereof and lying in a plane of said display such that the area of said display is larger than an area of the image representing the unmanipulated frame of said picture, said image representing the unmanipulated frame of said picture at least including a boundary of said unmanipulated frame of said picture, and such that said visual display means is operative under the control of said computer to simultaneously display the image representing the manipulated frame with said boundary such that the relationship of said image representing the manipulated frame with said boundary can be observed even when the image representing the manipulated frame is displayed at least partly outside of said boundary.

13. A computer according to claim 9, wherein said visual display means is operative to display said image representing said frame of said picture in the form of an outline which, when said frame of said picture is unmanipulated, is rectangular and corresponds to the edges thereof.

14. A computer according to claim 13, wherein said visual display means is operative to display said image representing said frame of said picture in the form of a grid of lines within said outline and which, when said frame of said picture is unmanipulated, are parallel to respective edges of said outline.

15. A computer according to claim 9, wherein said manual input means includes autosize control means for entering autosize command information to said computer and said computer is operative in response to said autosize command information to generate data representing an expansion of a manipulated frame of said picture including an area smaller than that of the unmanipulated frame of said picture to an extent that it covers all of the area of the unmanipulated frame of said picture.

16. A computer according to claim 9, wherein said manual input means includes a plurality of function keys operative to enter functional feature commands to said computer, and said computer is operative under software control for controlling said visual display means to display, along a bottom of the display provided thereby, a row of labels identifying functional features currently available by operating corresponding ones of said function keys of said manual input means.

17. A computer according to claim 9, which is connected to said picture manipulator by said interconnecting means to supply said data representing a desired manipulation thereto as said data is generated.

18. A computer according to claim 10, further comprising storing means for storing said data representing a desired manipulation generated therein in a storage medium for subsequent supply to said picture manipulator.

19. A computer according to claim 18, wherein said storing means is operate to store said data representing a desired manipulation in a storage medium which can be removed from the computer such that said data representing a desired manipulation may be read from said storage medium by another like computer connected to said picture manipulator and supplied to said picture manipulator by said other computer.

20. For use with a computer operative under processing software control to supply data to a picture manipulator representing a desired manipulation of a frame of a picture represented by a corresponding video signal frame supplied thereto for rearranging said corresponding video signal frame such that at least one geometrical parameter of said frame of said picture is thereby changed, said computer being further operative under display software control for producing an image representing said frame of said picture on a visual display unit thereof which image is subjected to the manipulation that is desired for said frame of said picture, said computer having input means for reading said processing software and said display software from a storage medium, a storage device comprising:

a storage medium having said processing software stored therein for controlling the supply of said data by said computer to the picture manipulator for carrying out said desired manipulation, the storage medium further having said display software stored therein for controlling the production of said image on said visual display unit so that said image is subjected to the manipulation that is desired for the frame of said picture; and means for supporting said storage medium for removably engaging said input means with said storage medium to supply said processing software and said display software thereto, such that said storage device is removable from engagement with said input means by a user of the computer so that said storage device is usable with a selected one of a plurality of computers.

21. The storage device of claim 20, wherein said storage device comprises a floppy disc.

22. The storage device of claim 20, wherein said storage medium is operative to store processing software and display software produced by said computer.

* * * * *